US010633510B2

(12) United States Patent
Takahata et al.

(10) Patent No.: US 10,633,510 B2
(45) Date of Patent: Apr. 28, 2020

(54) COLORANT FOR PLASTIC, COLORING COMPOSITION FOR PLASTIC USING THE SAME, AND PLASTIC MOLDED ARTICLE

(71) Applicants: TOYO INK SC HOLDINGS CO., LTD., Tokyo (JP); TOYOCOLOR CO., LTD., Tokyo (JP)

(72) Inventors: Noriyoshi Takahata, Tokyo (JP); Akimitsu Mochizuki, Tokyo (JP); Naoki Hamada, Tokyo (JP); Takashi Kasuya, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 29 days.

(21) Appl. No.: 15/128,431

(22) PCT Filed: Jul. 4, 2014

(86) PCT No.: PCT/JP2014/067908
§ 371 (c)(1),
(2) Date: Sep. 23, 2016

(87) PCT Pub. No.: WO2015/145792
PCT Pub. Date: Oct. 1, 2015

(65) Prior Publication Data
US 2017/0107350 A1 Apr. 20, 2017

(30) Foreign Application Priority Data

Mar. 24, 2014 (JP) ................................ 2014-060232

(51) Int. Cl.
| | | |
|---|---|---|
| *C08K 5/00* | (2006.01) | |
| *C09B 67/16* | (2006.01) | |
| *C09B 67/22* | (2006.01) | |
| *C08L 101/00* | (2006.01) | |
| *C09B 47/06* | (2006.01) | |
| *C09B 47/10* | (2006.01) | |

(52) U.S. Cl.
CPC .......... *C08K 5/0091* (2013.01); *C08L 101/00* (2013.01); *C09B 47/061* (2013.01); *C09B 47/10* (2013.01); *C09B 67/0019* (2013.01); *C09B 67/0035* (2013.01); *C08K 5/0041* (2013.01)

(58) Field of Classification Search
CPC ..................................................... C09B 47/10
See application file for complete search history.

(56) References Cited

U.S. PATENT DOCUMENTS

| | | | |
|---|---|---|---|
| 2,914,538 A | 11/1959 | Randall et al. | |
| 2,917,518 A * | 12/1959 | Merner | ............... C09B 67/0019 540/122 |
| 4,980,258 A * | 12/1990 | Aoki | .................... G03G 9/0918 430/108.2 |
| 5,153,314 A * | 10/1992 | Segawa | .................. C09B 47/06 540/144 |
| 2005/0004276 A1 * | 1/2005 | Hamada | ................... C08J 3/226 524/88 |

FOREIGN PATENT DOCUMENTS

| | | |
|---|---|---|
| JP | S53-7185 | 3/1978 |
| JP | S57-155242 | 9/1982 |
| JP | S58-125752 | 7/1983 |
| JP | H03-12432 | 1/1991 |
| JP | H07-292271 | 11/1995 |
| JP | 2004-131612 | 4/2004 |
| JP | 2004-331922 | 11/2004 |
| JP | 2005-23310 | 1/2005 |
| JP | 2007-204658 | 8/2007 |

OTHER PUBLICATIONS

Aravindakshan (Copper Phthalocyanines. Paint & Coatings Industry Magazine. 2005, 7 pages, https://www.pcimag.com/articles/83452-copper-phthalocyanines).*
"International Search Report (Form PCT/ISA/210) of PCT/JP2014/067908", dated Aug. 5, 2014, with English translation thereof, pp. 1-4.
"International Preliminary Report on Patentability; this report contains the following items :Form PCT/IB/338, PCT/IB/373, PCT/ISA237(cover sheet), PCT/ISA237(Box No. I),PCT/ISA237(Box No. V)", dated Oct. 6, 2016, which is English translation of "Written Opinion of the International Searching Authority", p. 1-p. 6.
"Office Action of Japan Counterpart Application", dated Jan. 6, 2015, pp. 1-3, with machine English translation thereof.

* cited by examiner

*Primary Examiner* — Brieann R Johnston
(74) *Attorney, Agent, or Firm* — JCIPRNET

(57) ABSTRACT

A colorant for plastic containing a halogenated phthalocyanine pigment (A) that satisfies conditions (1) to (4) below: (1) the average number of halogen substitutions is at least 2.0 but not more than 7.0, (2) the halogen distribution width is at least 5, (3) the amount of aluminum phthalocyanine and halogenated aluminum phthalocyanine is not more than 1.0% by mass, and (4) the central element is at least one element selected from the group consisting of hydrogen, manganese, iron, cobalt, zinc, nickel and copper. As a result, a colorant for plastic can be shown that can color a resin without changing the mechanical or chemical properties of the resin, and in particular can produce a plastic molded article having essentially no migration, extremely low discoloration due to heat, and no deformation such as warping and distortion.

10 Claims, No Drawings

COLORANT FOR PLASTIC, COLORING COMPOSITION FOR PLASTIC USING THE SAME, AND PLASTIC MOLDED ARTICLE

CROSS-REFERENCE TO RELATED APPLICATION

This application is a 371 application of the international PCT application serial no. PCT/JP2014/067908, filed on Jul. 4, 2014, which claims the priority benefit of Japan application no. 2014-060232, filed on Mar. 24, 2014. The entirety of each of the abovementioned patent applications is hereby incorporated by reference herein and made a part of this specification.

TECHNICAL FIELD

The present invention relates to a colorant for plastic. Specifically, the invention relates to a colorant for plastic that can color a molding resin, and in particular a resin having partial crystallinity, without changing the mechanical or chemical properties of the resin, and can produce a plastic molded article having no deformation such as warping or distortion, and also relates to a coloring composition for plastic using the colorant. Further, the present invention also relates to a plastic molded article having essentially no migration, extremely low discoloration due to heat, and no deformation.

BACKGROUND ART

Organic pigments typified by phthalocyanine and the like have properties including light resistance, heat resistance, migration resistance, vivid coloration, and superior color strength. When these types of organic pigments are used for coloring resins having partial crystallinity such as polyolefins and polyesters, the large nucleation effect of the pigment tends to effect the crystallinity, such as increasing the crystallization temperature of the resin having particle crystallinity and reducing the size of the spherulites, thus causing a phenomenon in which the shrinkage characteristics and/or the shrinkage balance (mold shrinkage, shrinkage difference) of the colored resin change. As a result, deformation such as distortions or dimensional variations has tended to appear in molded articles using resins having partial crystallinity, causing molding process problems. Deformation such as distortions can be a fatal problem for plastic molded articles such as containers, resin pallets, caps and bottles.

One method for reducing deformation such as distortions in plastic molded articles involves using a mold that takes account of dimensional variations caused by deformation such as distortions. However, because the shrinkage of the molded article varies considerably depending on the type of resin, the type of colorant, the type of additives and the molding conditions and the like, designing a mold that takes account of deformation is difficult, and numerous mold modifications must be performed. Mold manufacturers also attempt to reduce deformation by altering the process conditions such as the molding temperature, the injection pressure, the injection time, the injection rate and the cooling time and the like. But even in these cases, because the shrinkage of the molded article still varies depending on the type of resin, the type of colorant, the type of additives, and the size and shape of the molded article, setting process conditions that predict deformation is difficult, and numerous modifications of the process conditions by trial and error are typically required. Further, other problems arise in that the molding cycle lengthens, and the productivity deteriorates.

The addition of crystallization agents (crystal nucleating agents, nucleating agents or crystallization accelerators) is also used as a method for reducing deformation. In one such method, by adding a crystallization agent containing a large amount of a component that can function as a crystal nucleus, fine crystals can be formed uniformly and rapidly, and the effect of the pigment on shrinkage can be reduced, thereby reducing deformation. Alternatively, in another method, by adding a crystallization agent that causes shrinkage in a different direction from the direction of shrinkage caused by the pigment, any apparent shrinkage difference is eliminated, thereby reducing deformation. It is known that by using a crystallization agent, the molding cycle can be shortened, and the rigidity and transparency can be improved.

However, methods involving the addition of a crystallization agent still have an inadequate effect on mold distortions caused by organic pigments. Accordingly, the ideal method is to modify the pigment used as the colorant so that it does not act as a crystal nucleus. Examples of methods that have been used for modifying the pigment include methods in which the crystal form, the particle size or the shape of the pigment is altered, methods that use pigments having any of various substituents introduced into the pigment structure, methods for modifying the pigment surface by adding a pigment or a pigment derivative (organic dye derivative) having any of various substituents introduced into the pigment structure, and methods for modifying the pigment surface by subjecting the pigment to a surface treatment with a resin and/or silane coupling agent or the like.

Methods in which the crystal form, the particle size or the shape of the pigment is altered are disclosed in Patent Literature 1, Patent Literature 2 and Patent Literature 3. However, none of these methods yields an adequate effect. Further, there is a possibility that altering the crystal form, the particle size or the shape of the pigment may have an adverse effect on the original properties of the pigment such as the hue, dispersibility, color strength, heat resistance and light resistance.

Methods that use pigments having any of various substituents introduced into the pigment structure are disclosed in Non-Patent Literature 1 and Patent Literature 4. These methods involve introducing a prescribed number of halogens into a phthalocyanine structure. Although deformation is reduced in these methods, other problems arise, including a deterioration in properties such as the superior color strength and high vividness that the original phthalocyanine pigment displayed, and a large change in the hue.

Examples of methods for modifying the pigment surface by adding a pigment derivative (organic dye derivative) having any of various substituents introduced into the pigment structure include examples using phthalimidomethyl derivatives disclosed in Patent Literature 5 and Patent Literature 6. Although these methods enable some reduction in deformation, the effect is still inadequate, and another problem arises in that if the derivative is added in a large amount to reduce deformation, then the migration resistance tends to deteriorate.

Another example of a method for modifying the pigment surface by adding a pigment derivative (organic dye derivative) having any of various substituents introduced into the pigment structure is disclosed in Patent Literature 7. Patent Literature 7 discloses a mixture of a copper phthalocyanine pigment derivative, a halogenated phthalocyanine and phthalocyanine.

CITATION LIST

Patent Literature

PLT 1: JP H04-376232 A
PLT 2: JP S57-155242 A
PLT 3: JP S58-125752 A
PLT 4: JP 2004-131612 A
PLT 5: JP S53-7185 B
PLT 6: JP H03-12432 A
PLT 7: JP 2005-23310 A

Non-Patent Literature

NPL 1: Journal of the Japan Society of Colour Material, vol. 76, page 97 (2003)

SUMMARY OF INVENTION

Technical Problem

The inventors of the present invention found that the method disclosed in Patent Literature 7 had the following problems. Because a copper phthalocyanine pigment derivative is used as an essential component, weather resistance and heat resistance are problematic. Further, because the pigment is contaminated with aluminum phthalocyanine that is generated as a by-product in the production process, migration resistance can be problematic in exacting applications.

As mentioned above, the present invention provides a colorant for plastic that can color a molding resin, and particularly a resin having partial crystallinity, without changing the mechanical or chemical properties of the resin, and in particular, can produce a plastic molded article having essentially no migration, extremely low discoloration due to heat, and no deformation such as warping or distortion. Further, the present invention provides a coloring composition for plastic capable of forming a plastic molded article having essentially no migration, extremely low discoloration due to heat, and no deformation, as well as a plastic molded article that uses the coloring composition for plastic.

Solution to Problem

The present invention relates to a colorant for plastic containing a halogenated phthalocyanine pigment (A) that satisfies conditions (1) to (4) below:
(1) the average number of halogen substitutions is at least 2.0 but not more than 7.0,
(2) the halogen distribution width is at least 5,
(3) the amount of aluminum phthalocyanine and halogenated aluminum phthalocyanine is not more than 1.0% by mass, and
(4) the central element is at least one element selected from the group consisting of hydrogen, manganese, iron, cobalt, zinc, nickel and copper.

Further, the present invention also relates to a coloring composition for plastic containing the above colorant for plastic.

Moreover, the present invention also relates to a plastic molded article molded using the above coloring composition for plastic.

Advantageous Effects of Invention

The present invention is able to provide a colorant for plastic that can color a molding resin, and particularly a resin having partial crystallinity, without changing the mechanical or chemical properties of the resin, and can produce a plastic molded article having essentially no migration, extremely low discoloration due to heat, and no deformation such as warping or distortion. Further, the present invention can also provide a coloring composition for plastic capable of forming a plastic molded article having essentially no migration, extremely low discoloration due to heat, and no deformation, as well as a plastic molded article that uses the coloring composition for plastic.

DESCRIPTION OF EMBODIMENTS

This application is related to the subject matter disclosed in Japanese Application 2014-60232 filed on Mar. 24, 2014; the entire contents of which are incorporated by reference herein.

The present invention is described below in detail. In the present description, unless specifically stated otherwise, "parts" means "parts by mass" and "%" means "% by mass".

<Colorant for Plastic>

The colorant for plastic according to the present invention contains a halogenated phthalocyanine pigment (A) that satisfies conditions (1) to (4) below:
(1) the average number of halogen substitutions is at least 2.0 but not more than 7.0,
(2) the halogen distribution width is at least 5,
(3) the amount of aluminum phthalocyanine and halogenated aluminum phthalocyanine is not more than 1.0% by mass, and
(4) the central element is at least one element selected from the group consisting of hydrogen, manganese, iron, cobalt, zinc, nickel and copper.

The free copper content in the halogenated phthalocyanine pigment (A) described above is preferably not more than 200 mg/kg.

The colorant for plastic of the present invention preferably also contains a phthalocyanine pigment (B) in which the average number of halogen substitutions is not more than 1.1.

The free copper content in the phthalocyanine pigment (B) is preferably not more than 200 mg/kg.

The amount of the halogenated phthalocyanine pigment (A), relative to the total amount of the halogenated phthalocyanine pigment (A) and the phthalocyanine pigment (B), is preferably from 10 to 50% by mass.

In the present invention, examples of the "halogen" include bromine, chlorine and iodine, and bromine and chlorine are preferred. In other words, the halogenated phthalocyanine pigment (A) is preferably a pigment having at least one of bromine and chlorine as a halogen substituent. This definition of halogen is the same for the phthalocyanine pigment (B) and the like.

(Colorant for Plastic Containing Halogenated Phthalocyanine Pigment (A))

First is a description of a colorant for plastic containing the halogenated phthalocyanine pigment (A). When the average number of halogen substitutions in the halogenated phthalocyanine pigment (A) is at least 2.0, the reduction effect on deformation such as distortions is satisfactory, and when the average number of halogen substitutions is not more than 7.0, the hue does not adopt a greenish color, and the pigment exhibits the properties of a blue colorant.

Accordingly, in order to ensure a satisfactory effect, the average number of halogen substitutions must be at least 2.0 but not more than 7.0, and is preferably at least 2.0 but not more than 4.0.

The halogenated phthalocyanine pigment (A) in the present invention is a mixture of a plurality of halogenated organic pigments having different numbers of halogen substitutions. Accordingly, in the present invention, "the average number of halogen substitutions" describes the number of moles of halogen atoms per 1 mol of the halogenated phthalocyanine pigment (A), and can be determined by converting the amount of halogen within the entire pigment quantified by ion chromatography to a value for the number of halogen substitutions per 1 mol of the pigment. Details are described below.

Further, when the halogen distribution width is at least 5, the deformation reduction effect is satisfactory. Accordingly, in order to ensure that the present invention exhibits a satisfactory effect, the halogen distribution width must be at least 5, and is preferably at least 5 but not more than 6.

In the present invention, the "halogen distribution width" is the number of chemical species having different numbers of halogen substituents, and can be determined by calculating the signal intensity of the molecular ion peak for each pigment (namely, each peak value) using a mass spectrogram, and the combined value obtained by totaling all of the peaks (total peak value), and then counting the number of peaks attributable to phthalocyanines for which the ratio of the peak value relative to the total peak value exceeds a prescribed value (peak intensity). For example, in those cases where the mass spectrogram includes peaks attributable to phthalocyanines for which the number of halogen substituents is 0, 1, 2, 3, 4 and 5, the halogen distribution width is 6.

In order to ensure that the effects of the present invention manifest satisfactorily, the amount of aluminum phthalocyanine and halogenated aluminum phthalocyanine impurities within the halogenated phthalocyanine pigment (A) must be not more than 1.0% of the halogenated phthalocyanine pigment (A). Aluminum phthalocyanine and halogenated aluminum phthalocyanine are often incorporated as by-products when halogenated phthalocyanine pigments are produced by a conventional molten aluminum chloride method. The incorporation of this aluminum phthalocyanine and halogenated aluminum phthalocyanine not only causes deterioration in the migration resistance, the vividness and the coloration, but may also have an adverse effect on the deformation reduction effect. In order to ensure that the effects of the present invention manifest satisfactorily, the amount of aluminum phthalocyanine and halogenated aluminum phthalocyanine is preferably less than 0.1% within the halogenated phthalocyanine pigment (A).

In order to obtain an average number of halogen substitutions of at least 2.0 but not more than 7.0, a halogen distribution width of at least 5, and an amount of aluminum phthalocyanine and halogenated aluminum phthalocyanine within the halogenated phthalocyanine pigment (A) of not more than 1.0%, the method used for producing the halogenated phthalocyanine pigment (A) preferably employs either the improved molten aluminum chloride method disclosed in JP H07-292271 A or the method described below that uses an N-haloimide compound as the halogenating agent, with the amount added of the halogenating agent, the halogenation reaction time and the reaction temperature and the like each being adjusted as appropriate to produce the halogenated phthalocyanine pigment (A). In the present invention, the halogenated phthalocyanine pigment (A) is preferably produced by the method using an N-haloimide compound as the halogenating agent. Details of this production method are described below.

In order to ensure that the effects of the present invention manifest satisfactorily, the free copper content in the halogenated phthalocyanine pigment (A) is preferably not more than 200 mg/kg. Free copper exists in the form of metallic copper or copper compounds other than the halogenated copper phthalocyanine, and is often incorporated as a by-product during the production of crude copper phthalocyanine and crude copper phthalocyanine green. When free copper is incorporated in the pigment in a large amount, decomposition of the molding resin and hydrolysis of ester bonds tend to be accelerated at high temperature, which has an adverse effect on the physical properties and the hue of the molding resin and increases the possibility of a deterioration in the quality of the molded article.

In order to ensure that the free copper content in the halogenated phthalocyanine pigment (A) is not more than 200 mg/kg, the free copper content can be adjusted after the halogenated phthalocyanine pigment (A) is produced, by performing a treatment with dilute sulfuric acid and/or dilute nitric acid or the like. In the present invention, producing the halogenated phthalocyanine pigment (A) with the method described below that uses an N-haloimide compound as the halogenating agent is preferred in terms of minimizing by-products and not requiring a pigment formation step. Details regarding this method for producing the halogenated phthalocyanine pigment (A) are described below.

The halogenated phthalocyanine pigment (A) includes a pigment in which the central element is at least one element selected from the group consisting of hydrogen, manganese, iron, cobalt, zinc, nickel and copper.

In the present invention, the expression that the halogenated phthalocyanine pigment (A) includes a pigment in which "the central element is at least one element selected from the group consisting of hydrogen, manganese, iron, cobalt, zinc, nickel and copper" describes aspects including those containing at least one metal phthalocyanine in which the two hydrogen atoms bonded to the nitrogen atoms of the pyrrole rings in the phthalocyanine structure are substituted with one element selected from the group consisting of manganese, iron, cobalt, zinc, nickel and copper, and/or phthalocyanine which has two hydrogen atoms bonded to the nitrogen atoms of the pyrrole rings.

In other words, it is preferable that the halogenated phthalocyanine pigment (A) contains at least one of a halogenated phthalocyanine in which the phthalocyanine structure is substituted with a plurality of halogens, and a halogenated metal phthalocyanine in which the phthalocyanine structure is substituted with a plurality of halogens, and moreover in those cases where the halogenated phthalocyanine pigment (A) includes a halogenated metal phthalocyanine, the halogenated phthalocyanine pigment (A) preferably includes at least one halogenated metal phthalocyanine in which the central element is an element selected from the group consisting of manganese, iron, cobalt, zinc, nickel and copper.

In those cases where the halogenated phthalocyanine pigment (A) includes a halogenated metal phthalocyanine, it is even more preferable that the halogenated phthalocyanine pigment (A) includes a copper phthalocyanine in which the central element is copper.

(Colorant for Plastic Containing Halogenated Phthalocyanine Pigment (A) and Phthalocyanine Pigment (B))

Next is a description of a colorant for plastic that contains the halogenated phthalocyanine pigment (A) and the phthalocyanine pigment (B). In order to enhance the attractiveness of the colorant for plastic as a coloring material, and expand the industrial usability, the colorant for plastic preferably contains the phthalocyanine pigment (B) having an average number of halogen substitutions of not more than 1.1 in addition to the halogenated phthalocyanine pigment (A).

In one aspect of the phthalocyanine pigment (B), the average number of halogen substitutions is preferably zero. Further, in another aspect of the phthalocyanine pigment (B), in a similar manner to that described for the halogenated phthalocyanine pigment (A), the amount of aluminum phthalocyanine and halogenated aluminum phthalocyanine impurities within the phthalocyanine pigment (B) is preferably not more than 1.0%, and more preferably less than 0.1%. Further, the free copper content within the phthalocyanine pigment (B) is preferably not more than 200 mg/kg.

The phthalocyanine pigment (B) for which the average number of halogen substitutions satisfies the above range may be a phthalocyanine compound that is not substituted with halogens, or in those cases where a raw material phthalocyanine (D) is halogenated with a halogenating agent, may be a phthalocyanine compound that has been produced with appropriate adjustment of the amount of halogenating agent added, the halogenation reaction time and the reaction temperature and the like, so that the average number of halogen substitutions is not more than 1.1. The phthalocyanine (D) mentioned above is described below.

Further, in a similar manner to that described for the halogenated phthalocyanine pigment (A), in order to ensure that the amount of aluminum phthalocyanine and halogenated aluminum phthalocyanine and the free copper content within the phthalocyanine pigment (B) satisfy the ranges specified above, the method used for producing the phthalocyanine pigment (B) may employ either the method disclosed in JP H07-292271 A or the method described below that uses an N-haloimide compound as the halogenating agent. Details relating to the method for producing the phthalocyanine pigment (B) are described below.

The ratio between the halogenated phthalocyanine pigment (A) and the phthalocyanine pigment (B) is set so that the amount of the halogenated phthalocyanine pigment (A) relative to the total amount of the halogenated phthalocyanine pigment (A) and the phthalocyanine pigment (B) is preferably within a range from 10 to 50%, and more preferably from 10 to 40%. By ensuring the amount satisfies this range, the balance between the hue and low shrinkage properties improves.

The phthalocyanine pigment (B) preferably includes a pigment in which the central element is at least one element selected from the group consisting of hydrogen, manganese, iron, cobalt, zinc, nickel and copper. The definition of central element is the same as that described above for the halogenated phthalocyanine pigment (A).

In those cases where the phthalocyanine pigment (B) includes a metal phthalocyanine, it is particularly preferable that the phthalocyanine pigment (B) includes a copper phthalocyanine in which the central element is copper. Further, the phthalocyanine pigment (B) may adopt any of various crystal forms such as an α-form, β-form or ε-form, but from the viewpoint of heat resistance, an α-form or β-form is preferable. Moreover, if the attractiveness of the colorant for plastic is considered, then from the viewpoint of the attractiveness as a coloring material, an α-form is particularly preferred.

Adjustment of the crystal form of the phthalocyanine pigment (B) can be performed using conventional methods. For example, a β-form phthalocyanine pigment (B) can be obtained by subjecting a phthalocyanine pigment in which the average number of halogen substitutions, and if necessary the amount of aluminum phthalocyanine and halogenated aluminum phthalocyanine and the free copper content, have been set to values within the above ranges to a solvent salt milling treatment.

(Method for Producing Halogenated Phthalocyanine Pigment)

There are no particular limitations on the production method used for obtaining the halogenated phthalocyanine pigment (A), provided a pigment that satisfies the above conditions (1) to (4) can be produced. Examples of the production method include first to third methods described below.

The first method is a method that includes steps of producing crude halogenated phthalocyanines using halogenated phthalic acids having different numbers of halogen substitutions, mixing the crude halogenated phthalocyanines appropriately so as to achieve an average number of halogen substitutions of at least 2.0 but not more than 7.0 and a halogen distribution width of at least 5, and then performing pigment formation, and if necessary a step of reducing the free copper content using dilute sulfuric acid and/or dilute nitric acid.

The second method is a method in which a halogenated phthalocyanine obtained using the production method disclosed in JP H07-292271 A is subjected to a pigment formation step and a step of reducing the free copper content using dilute sulfuric acid or the like.

The third method is a method for halogenating a raw material such as a phthalocyanine by a halogenation reaction using a specific halogenating agent described below. If this method is used, then because a step of removing aluminum phthalocyanine and halogenated aluminum phthalocyanine, a step of removing free copper and a pigment formation step are unnecessary, the halogenated phthalocyanine pigment (A) can be obtained simply. Accordingly, in the present invention, production is preferably performed using this third method.

The aforementioned production method involving a halogenation reaction using the aforementioned specific halogenating agent is described below in detail.

The production method using a specific halogenating agent uses an N-haloimide compound as the halogenating agent to halogenate a raw material phthalocyanine (C) to obtain the halogenated phthalocyanine pigment (A), and then precipitates the halogenated phthalocyanine pigment (A) within a poor solvent.

Examples of the advantages of the above production method that involves performing a halogenation reaction using an N-haloimide compound include the points described below. One advantage is that because aluminum phthalocyanine, halogenated aluminum phthalocyanine and free copper are less likely to be produced, steps of removing these components are unnecessary, and a pigment formation step is also unnecessary. Another advantage is that the reaction does not use highly toxic chlorine gas or bromine, and does not generate harmful hydrogen halide gases as by-products during reaction, meaning the production method offers extremely high levels of safety.

Examples of the raw material phthalocyanine (C) used in the production of the halogenated phthalocyanine pigment (A) include unsubstituted phthalocyanine and unsubstituted metal phthalocyanines having no substituents at the α-positions or β-positions of the phthalocyanine structure. Further, although undesirable in terms of production costs, it is also possible to use a halogenated phthalocyanine and/or a halogenated metal phthalocyanine as the raw material other than an unsubstituted phthalocyanine or unsubstituted metal phthalocyanine, and produce a phthalocyanine pigment having an increased average number of halogen substitutions. The metal phthalocyanine mentioned above preferably includes at least one compound in which the central element is at least one element selected from the group consisting of manganese, iron, cobalt, zinc, nickel and copper. Among these, copper phthalocyanine in which the central element is copper is particularly preferred.

In terms of environmental safety and quality, the N-haloimide compound is preferably at least one N-haloimide compound selected from the group consisting of trichloroisocyanuric acid, dichloroisocyanuric acid, tribromoisocyanuric acid, dibromoisocyanuric acid and metal salts of these compounds, and such a compound is also preferred in terms of cost. Among these compounds, N-chloroimide compounds used in chlorination reactions are widely used as disinfectants for swimming pool water and bath water and the like, and because these compounds are easy to handle and offer high levels of safety, they are particularly desirable.

Although there are no particular limitations on the aforementioned metal salts that can be used as the N-haloimide compound, from the viewpoints of cost and ease of availability, alkali metal salts are preferred, sodium salts and potassium salts are more preferred, and sodium salts are particularly desirable. Particularly preferred aspects of the halogenating agent used in the present invention include aspects containing at least one N-haloimide compound selected from the group consisting of trichloroisocyanuric acid, dichloroisocyanuric acid, sodium dichloroisocyanurate, tribromoisocyanuric acid, dibromoisocyanuric acid and sodium dibromoisocyanurate. Aspects containing at least one N-chloroimide compound selected from the group consisting of trichloroisocyanuric acid, dichloroisocyanuric acid and sodium dichloroisocyanurate, which are widely used as disinfectants for swimming pool water and bath water and the like, and can be said to be compounds that are easy to handle and offer high levels of safety, are examples of particularly desirable aspects.

The amount used of the N-haloimide compound varies depending on the average number of halogen substitutions and the halogen distribution width of the target halogenated phthalocyanine pigment (A), but for example, when a halogen-unsubstituted phthalocyanine is used as the raw material, the average number of halogen substitutions is set to 2, and the halogen distribution width is set to 5, the N-haloimide compound is preferably used in an amount that provides from 1.8 to 3.0 molar equivalents of effective halogen relative to the raw material, whereas when the average number of halogen substitutions is set to 7, and the halogen distribution width is set to 5, the N-haloimide compound is preferably used in an amount that provides from 6.5 to 10 molar equivalents of effective halogen relative to the raw material.

The term "of effective halogen" means obtaining the value (molar equivalent value) by multiplying the number of moles of the N-haloimide compound by the number of halogen atoms within the molecule of the N-haloimide compound. In other words, if 2 mol of trichloroisocyanuric acid is used as the N-haloimide compound, then because the trichloroisocyanuric acid has 3 chlorine atoms within each molecule, the N-haloimide compound provides 6 molar equivalents of effective halogen.

There are no particular limitations on the solvent used in the above production method, provided it dissolves the raw material phthalocyanine (C), does not impair the halogenation reaction, and does not cause decomposition of the phthalocyanine structure. From the viewpoint of the reaction yield and the like, the use of a strong acid is preferred. Examples of strong acids include inorganic acids such as sulfuric acid, fuming sulfuric acid, chlorosulfonic acid and polyphosphoric acid, and organic acids such as trifluoroacetic acid, dichloroacetic acid, methanesulfonic acid and ethanesulfonic acid. These strong acids may be used individually or mixed. From the viewpoints of cost, reaction yield and convenience of the production process and the like, an inorganic acid is preferred, and the use of at least one acid selected from the group consisting of sulfuric acid, fuming sulfuric acid, chlorosulfonic acid, polyphosphoric acid, and mixtures of two or more of these acids is particularly preferred. If the water content of sulfuric acid is too large, then there is a possibility that it may cause decomposition of the phthalocyanine structure, and therefore high-concentration sulfuric acid having a concentration of at least 90% is preferred.

There are no particular limitations on the amount of the solvent, but an amount that is 5 to 20 times the mass of the raw material is preferred.

In the halogenation reaction of the above production method, a catalyst is preferably added to improve the reaction rate. The same type of catalyst as that used when halogenating a phthalocyanine (C) using chlorine gas or bromine in a strong acid solvent may be used, and specific examples include sulfur compounds such as sulfur and disulfur dichloride, iodine compounds such as iodine, iodine chloride and iodine bromide, and metal chloride compounds such as ferric chloride, cuprous chloride, cupric chloride, aluminum chloride and antimony chloride.

The temperature during the halogenation reaction is preferably a temperature that yields a high reaction rate for the halogenation reaction, and suppresses side reactions such as decomposition reactions of the phthalocyanine structure, sulfonation reactions and chlorosulfonation reactions, and may be set appropriately in accordance with factors such as the type of phthalocyanine, the type of strong acid, the type of N-haloimide compound, the type of catalyst, and the number of halogen substitutions. The temperature is preferably from 0 to 150° C., and more preferably from 10 to 100° C.

The reaction time for the halogenation reaction is also affected by the dissolution rate of the N-haloimide compound in the solvent, and therefore the time may be set appropriately in accordance with the particle size of the N-haloimide compound and the stirring rate of the reaction mixture within the reaction vessel, but in those cases where the particles of the N-haloimide compound have a size of several millimeters and adequate stirring is performed, the reaction time is preferably from 30 minutes to 10 hours, and more preferably from 1 to 5 hours.

A halogen-unsubstituted phthalocyanine and/or a halogen-unsubstituted metal phthalocyanine may be used, as is, as the phthalocyanine pigment (B), or a phthalocyanine that has been halogenated so that the average number of halogen substitutions is not more than 1.1 may be used.

In the case of a halogenated phthalocyanine pigment (B), a conventional chlorinated phthalic acid may be used, or a compound produced using the same production method as that described for the halogenated phthalocyanine pigment (A) may be used. In terms of the method used for producing the halogenated phthalocyanine pigment (B), the third method described in relation to the method for producing the halogenated phthalocyanine pigment (A), namely a method in which the raw material phthalocyanine (D) is halogenated using an appropriate amount of an N-haloimide compound as the halogenating agent so as to achieve an average number of halogen substitutions of not more than 1.1, and the halogenated phthalocyanine is then precipitated in a poor solvent, does not require a step of removing aluminum phthalocyanine and halogenated aluminum phthalocyanine, a step of removing free copper, and a pigment formation step, and is consequently preferred. Examples of the phthalocyanine (D) include unsubstituted phthalocyanine and halogen-unsubstituted metal phthalocyanines having no substituents at the α-positions or β-positions of the phthalocyanine structure.

(Method for Preparing Colorant for Plastic)

The halogenated phthalocyanine pigment (A) described above can be used as the colorant for plastic of the present invention. In those cases where the colorant for plastic of the present invention contains the halogenated phthalocyanine pigment (A) and the phthalocyanine pigment (B), the colorant for plastic of the present invention can be obtained by mixing the halogenated phthalocyanine pigment (A) and the phthalocyanine pigment (B) using a conventional method.

When the average number of halogen substitutions for the phthalocyanine pigment (B) is zero, a colorant for plastic containing the halogenated phthalocyanine pigment (A) and the phthalocyanine pigment (B) can also be obtained by halogenating the aforementioned phthalocyanine (C) with an N-haloimide compound to produce the halogenated phthalocyanine pigment (A), subsequently adding the aforementioned phthalocyanine (D) as the phthalocyanine pigment (B), and then precipitating the mixture in a poor solvent.

The colorant for plastic according to the present invention may also contain other components typically used in pigments, such as organic pigments having low shrinkage (but excluding phthalocyanine-based organic pigments).

<Coloring Composition for Plastic>

Next is a description of a coloring composition for plastic according to the present invention, containing the colorant for plastic described above.

One preferred aspect of the coloring composition for plastic is a powdered pigment dispersion known as a dry color, which also contains at least one compound selected from the group consisting of aromatic carboxylic acids, aliphatic carboxylic acids, metal salts of aromatic carboxylic acids, metal salts of aliphatic carboxylic acids, and aliphatic carboxylic acid esters.

The coloring composition for plastic described above preferably contains from 1 to 1,000 parts of at least one compound selected from the group consisting of aromatic carboxylic acids, aliphatic carboxylic acids, metal salts of aromatic carboxylic acids, metal salts of aliphatic carboxylic acids, and aliphatic carboxylic acid esters as a dispersant per 100 parts of the colorant for plastic described above, and more preferably contains 40 to 100 parts of the dispersant.

Specific examples of the aliphatic carboxylic acids, aromatic carboxylic acids, and metal salts thereof are listed below. Examples of the aliphatic carboxylic acids include caprylic acid, oleic acid, stearic acid and montanoic acid, whereas examples of the aromatic carboxylic acids include phthalic acid and benzoic acid.

Examples of the metals within the aforementioned metal salts include lithium, calcium, magnesium and zinc.

Examples of the aliphatic carboxylic acid esters include methyl stearate, ethyl stearate, methyl montanoate, esterified products of montanoic acid and ethylene glycol, and esterified products of montanoic acid and butylene glycol.

Among these, metal salts of stearic acid, metal salts of phthalic acid and montanoic acid esters are preferred.

Because the coloring composition for plastic is in powdered form, has a high concentration of pigment and can contribute to coloring in small amounts, it is the most economical in terms of cost, and can be used favorably for coloring resins having partial crystallinity such as polyolefins and polyesters.

Another preferred aspect of the coloring composition for plastic of the present invention contains the colorant for plastic described above and a resin. This coloring composition for plastic may also include an aforementioned dispersant, namely one or more compounds selected from the group consisting of aromatic carboxylic acids, aliphatic carboxylic acids, metal salts of aromatic carboxylic acids, metal salts of aliphatic carboxylic acids, and aliphatic carboxylic acid esters.

At least one resin selected from the group consisting of polyethylene waxes and resins having partial crystallinity (but excluding polyethylene waxes) is preferably used as the resin mentioned above. Needless to say, the coloring composition for plastic of the present invention may also include both a polyethylene wax and a resin having partial crystallinity.

Coloring compositions for plastic containing a polyethylene wax as the resin can be used in aspects that are either powders having minimal scattering, or pelletized pigment dispersants.

A coloring composition for plastic containing a polyethylene wax offers superior workability to the powdered coloring composition for plastic described above, but in a similar manner to the powdered coloring composition for plastic described above, can be used favorably for coloring resins having partial crystallinity such as polyolefins.

The amount of the polyethylene wax in the coloring composition for plastic is preferably from 30 to 150 parts, and more preferably from 60 to 150 parts, per 100 parts of the colorant for plastic.

Polyethylene wax derivatives, oxidized polyethylene waxes and derivatives thereof, and polyethylene prepared using a metallocene catalyst or the like can also be used as the polyethylene wax included in the coloring composition for plastic described above. Among these, polyethylene waxes having a softening point of 120° C. or less are preferred, and waxes having a weight-average molecular weight measured by the viscosity method of not more than 10,000 are preferred.

Measurement of the softening point is performed in accordance with JIS K 2207.

Of the coloring compositions for plastic described above, a composition containing a resin having partial crystallinity as the aforementioned resin represents an aspect known as a master batch, and is generally supplied as a solid in pellet form or the like.

A resin having partial crystallinity means a resin having a structure in which the polymeric molecular chains that constitute the resin are arranged regularly, and having a glass transition temperature and a melting point. A resin having partial crystallinity has a differential scanning calorimetry curve obtained by differential scanning calorimetry measurements that does not exhibit stepwise endothermic changes, but rather has distinct endothermic peaks.

Specific examples of resins having partial crystallinity include homopolymers and copolymers and the like obtained using at least one compound selected from the group consisting of ethylene, propylene, butylene and styrene as a monomer component. More specific examples include polyolefins such as polyethylenes including high-density polyethylene (HDPE), linear low-density polyethylene (L-LDPE) and low-density polyethylene (LDPE) and the like, polypropylene, polybutylene and polystyrene. Examples of other useful resins include polyester resins such as polyethylene terephthalate, polyamide resins such as nylon 6 and nylon 66, polystyrene resins, and thermoplastic ionomer resins.

The colorant for plastic of the present invention has particularly marked effects on polyolefin resins, and therefore a polyolefin resin is preferred as the resin having partial crystallinity.

The aforementioned polyolefin resin is preferably a resin having an MFR (melt flow rate, so-called melt viscosity) measured in accordance with JIS K 7210 within a range from 0.001 to 30 g/10 minutes. When the MFR is at least 0.001 g/10 minutes, the molding processability of the coloring composition for plastic is favorable, and weld marks and flow marks are unlikely to occur in the molded articles. On the other hand, when the MFR is not more than 30 g/10 minutes, the molded article exhibits superior mechanical properties. In particular, in those cases where a high-density polyethylene (HDPE) is used, the MFR is preferably within a range from 0.005 to 10 g/10 minutes, whereas when a low-density polyethylene (LDPE), polypropylene and/or polybutylene is used, the MFR is preferably within a range from 0.005 to 20 g/10 minutes.

There are no particular limitations on the amount of the aforementioned resin having partial crystallinity within the coloring composition for plastic.

In those cases where the coloring composition for plastic contains the aforementioned colorant for plastic, the above dispersant and the above resin having partial crystallinity, and is used as a master batch, the total amount of the colorant for plastic and the dispersant is preferably from 0.001 to 10 parts per 100 parts of the resin having partial crystallinity.

Further, in those cases where the coloring composition for plastic contains the aforementioned colorant for plastic, the aforementioned polyethylene wax and the above resin having partial crystallinity, and is used as a master batch, the total amount of the colorant for plastic and the polyethylene wax is preferably from 0.001 to 10 parts per 100 parts of the resin having partial crystallinity.

A method for preparing the coloring composition for plastic of the present invention is described below.

When the coloring composition for plastic of the present invention contains the aforementioned colorant for plastic and a resin having partial crystallinity as the resin, the coloring composition for plastic of the present invention can be prepared by converting the resin having partial crystallinity into pellets, and then uniformly mixing the pelletized resin and the colorant for plastic using a mixer or the like.

When the coloring composition for plastic of the present invention contains the aforementioned colorant for plastic, the aforementioned dispersant, and a resin having partial crystallinity as the resin, the coloring composition for plastic of the present invention can be prepared by mixing the colorant for plastic and the dispersant to obtain a pigment dispersion, and then uniformly mixing pellets of the resin having partial crystallinity and the pigment dispersion using a mixer or the like.

When the coloring composition for plastic of the present invention contains the aforementioned colorant for plastic, the aforementioned dispersant, and a polyethylene wax and a resin having partial crystallinity as resins, the coloring composition for plastic of the present invention can be prepared by mixing the colorant for plastic, the dispersant and the polyethylene wax resin to obtain a pigment dispersion, and then uniformly mixing pellets of the resin having partial crystallinity and the pigment dispersion using a mixer or the like.

In those cases where a coloring composition for plastic of the present invention containing an aforementioned resin having partial crystallinity is used as a master batch in the production of a plastic molded article, additional resin having partial crystallinity may be added to the coloring composition for plastic to obtain the plastic molded article.

The coloring composition for plastic of the present invention may also contain other additional components, provided they do not impair the effects of the present invention or cause health problems. Examples of these additional components in the present invention include inorganic pigments; waxes and derivatives thereof; metal soaps such as heavy metal inactivators, alkali metals, alkaline earth metals and zinc; hydrotalcite; antistatic agents formed from nonionic surfactants, cationic surfactants, anionic surfactants or amphoteric surfactants; flame retardants such as halogen-based, phosphorus-based or metal oxide flame retardants; lubricants such as ethylene bisalkylamides; antioxidants; ultraviolet absorbers; processing aids; fillers; and various other conventional additives for polymers.

<Plastic Molded Article>

There are no particular limitations on the molding method used to obtain a molded article using the coloring composition for plastic according to the present invention. Examples of the molding method include injection molding, blow molding, inflation molding, extrusion molding, Engel molding and vacuum molding. Regardless of the molding method used, molded articles of the present invention are capable of providing a suppression effect on deformation such as distortions within the colored plastic molded articles.

Generally, it is known that deformation, such as distortions of molded articles that occur during injection molding due to an organic pigment existing within a resin having partial crystallinity, is caused as a result of a deterioration in the balance between the shrinkage of the molded article in the injection direction and the shrinkage of the molded article in a direction perpendicular to the injection direction. Accordingly, in those cases where, for example, the molded article is a molded plate, by measuring the shrinkage in the injection direction and the shrinkage in a direction perpendicular to the injection direction, and then calculating the shrinkage difference from a formula 1 shown below, the degree of deformation such as distortions within the molded article can be evaluated. Generally, the difference in the shrinkage difference values for a molded plate prepared using a colorant for plastic containing a pigment and a resin having partial crystallinity, and a molded plate prepared using only the resin having partial crystallinity (hereafter referred to as a "natural plate") is preferably low, and if this difference can be kept within a range of ±10%, then the description low-shrinkage pigment, or colorant for plastic with low shrinkage may be used.

When the colorant for plastic according to the present invention is used in preparing a molded article, this difference in the shrinkage difference values for the molded articles can be kept within a range from ±10%.

$$\text{Shrinkage difference} = \frac{\text{shrinkage in injection direction} - \text{shrinkage in perpedicular direction}}{\text{shrinkage in injection direction}}$$

[Mathematical formula 1]

EXAMPLES

The present invention is described below based on a series of examples, but the present invention is in no way limited by these examples. In the examples, unless specifically stated otherwise, "parts" and "%" represent "parts by mass" and "% by mass" respectively.

First, prior to describing the examples, the methods used for measuring the average number of halogen substitutions, the halogen distribution width, the amount of aluminum phthalocyanine and halogenated aluminum phthalocyanine, and the free copper content within the samples are described below. The methods for measuring the shrinkage, heat resistance and migration resistance of the molded articles are also described below.

<Average Number of Halogen Substitutions>

The average number of halogen substitutions within a pigment was obtained by quantifying the amount of halogen within the pigment, by combusting the pigment using the oxygen flask combustion method and then using an ion chromatograph (ICS-2000 ion chromatograph, manufactured by Dionex Corporation) to analyze the liquid obtained by absorbing the gas produced by the combustion in water, and then calculating the number of halogen substitutions per 1 mol of the pigment. Specifically, the "average number of halogen substitutions" was determined by determining the molar quantity of halogen within the entire pigment using an ion chromatograph, subsequently determining the molar quantity of the halogenated phthalocyanine pigment (A), and then calculating the number of halogen substitutions per 1 mol of the halogenated phthalocyanine pigment (A) from these molar quantities.

<Halogen Distribution Width, Amount of Aluminum Phthalocyanine and Halogenated Aluminum Phthalocyanine>

The halogen distribution width within a pigment, and the amount of aluminum phthalocyanine and halogenated aluminum phthalocyanine were determined using a time of flight mass spectrometer (Autoflex III (TOF-MS), manufactured by Bruker Daltonics Inc.).

The amount of aluminum phthalocyanine and halogenated aluminum phthalocyanine was determined from a mass spectrum obtained by mass analysis of the pigment powder, by calculating the signal intensity of the molecular ion peak corresponding with each component (namely, each peak value) and the combined value obtained by totaling all of the peaks (total peak value), and then determining the ratio of each peak value relative to the total peak value.

The halogen distribution width was determined by counting the number of peaks attributable to phthalocyanines for which the ratio of the peak value relative to the total peak value was at least 1% (peak intensity).

<Method for Measuring Free Copper Content>

The free copper content was determined using the following method. First, 5 g of the pigment was weighed and dissolved in 50 g of concentrated sulfuric acid, with care taken regarding heat generation, and stirring was performed for 4 hours to obtain a sulfuric acid solution. Following stirring, the sulfuric acid solution was added to 500 g of water to precipitate the pigment. Following thorough stirring, the pigment was separated by filtration and washed with water, and the filtrate and the washing water were combined and made up to 1,000 ml. Using atomic absorption spectrometry (polarized Zeeman atomic absorption spectrophotometer, model Z8100, manufactured by Hitachi, Ltd.), the copper concentration was determined by comparison with a calibration curve prepared using standard copper solutions. The thus obtained copper concentration was used to determine the free copper content per 1 kg of the pigment.

<Method for Evaluating Shrinkage>

Shrinkage and deformation such as distortion of the molded article were evaluated in the manner described below. First, using a shrinkage evaluation mold (a mold for preparing a plate having a length of 150 mm, a width of 120 mm and a thickness of 2 mm, and having 10.00 cm marked lines in both the injection direction and the perpendicular direction) in an injection molding apparatus, a natural plate was molded from a high-density polyethylene (product name: Hizex 2208J, softening point=130° C., manufactured by Prime Polymer Co., Ltd.). The thus molded natural plate was stored in a 25° C. thermostatic chamber for 3 days, the shrinkage difference was calculated from the ratio between the shrinkage in the injection direction and the shrinkage in the perpendicular direction, and the degree of deformation such as distortion was evaluated visually. The molding conditions for the natural plate included a molding temperature of 220° C. and a mold temperature of 40° C., and were adjusted so that the shrinkage difference for the natural plate was zero.

Subsequently, a coloring composition was prepared from the above high-density polyethylene and the colorant for plastic so as to achieve a pigment concentration of 0.1 PHR (0.1 parts of the colorant for plastic per 100 parts of the high-density polyethylene), and the coloring composition was used to form 20 colored plates by injection molding under the molding conditions described above that yielded a shrinkage difference of zero for the natural plate. The six plates from the 14th plate to the 19th plate were used for evaluation. Precision calipers were used to measure the distances between the marked lines, and the measured values were used to determine the shrinkage in the injection direction and the perpendicular direction. Subsequently, the shrinkage difference was calculated from the ratio between the shrinkage values in the injection direction and the perpendicular direction, and the degree of deformation such as distortion was evaluated visually. The shrinkage difference refers to the value determined using the above formula 1.

<Method for Evaluating Heat Resistance>

A high-density polyethylene (product name: Hizex 2208J, softening point=130° C., manufactured by Prime Polymer Co., Ltd.) was used as the resin having partial crystallinity used in this test. The test method was performed in accordance with German Industrial Standard DIN 12877-1. First, the resin having partial crystallinity and the colorant for plastic were combined to prepare a colored plate in which the color strength was a concentration of SD ⅓. Eleven colored plates were molded at 200° C. under conditions which yielded the shortest possible residence time, and the six colored plates from the 6th to the 11th plate were each subjected to color measurement using a colorimeter (Minolta Spectroscopic Colorimeter CM-2002, manufactured by Konica Minolta, Inc.). The average value of the measured color values was used as a control (standard). Subsequently, the molding conditions were altered so that the residence time within the barrel was 5 minutes, and 11 colored plates were molded at temperatures in 10° C. intervals from 200° C. to 300° C. The six colored plates from the 6th to the 11th plate at each temperature were each subjected to color measurement using a colorimeter, and the average value of the measured color values was calculated. The color difference ($\Delta E^*$) was then determined between each average value of the measured color values and the above control. The highest temperature for which $\Delta E^* < 2.0$ was recorded as the heat-resistant temperature. Further, using a plate molded at 300° C., the color difference ($\Delta E^*$) was determined, and used as one indicator of the heat resistance.

<Method for Evaluating Migration Resistance>

A coloring composition was prepared from a high-density polyethylene (product name: Hizex 2208J, softening point=130° C., manufactured by Prime Polymer Co., Ltd.) and the colorant for plastic so as to achieve a pigment concentration of 1.0 PHR (1 part of the colorant for plastic per 100 parts of the high-density polyethylene), and the coloring composition was used to prepare a plate in the same manner as that described above for the evaluation of shrinkage. The thus obtained plate was sandwiched between white flexible vinyl chloride sheets (having a hardness HDA value at 0 seconds measured in accordance with JIS K7215 (Testing methods for durometer hardness of plastics) of 63). Following heating at 180° C. for one minute under a pressure of 100 g/cm², the vinyl sheets were immediately removed from the plate, and the resistance to migration into the white flexible vinyl sheets was inspected visually, and evaluated against the 4-step criteria listed below.

◎: Absolutely no migration observed. Usable even in applications having exacting migration requirements.

○: Slight migration observed. Usable in applications other than applications having exacting migration requirements.

Δ: Some migration observed, but usable in limited applications.

x: Considerable migration, not suitable for use.

Example 1

First, 116 parts of 98% sulfuric acid and 24 parts of 30% fuming sulfuric acid were mixed to prepare 140 parts of 99.5% sulfuric acid, and 20 parts of a copper phthalocyanine (T-99 Crude Blue, manufactured by Zhuhai Toyochem Co., Ltd.) was then added while the sulfuric acid was cooled in an ice bath to maintain the temperature at 30° C. or lower. Subsequently, 0.1 parts of iodine was added, the mixture was then heated to 50° C., 8.8 parts of trichloroisocyanuric acid (1.1 times moles or 3.3 molar equivalents of effective chlorine relative to the copper phthalocyanine) was added, and the resulting mixture was stirred at the same temperature for 3 hours.

Subsequently, the reaction liquid was poured into 600 parts of water with constant stirring, and the resulting mixture was heated to 70° C., filtered, and then sequentially washed with hot water, washed with a 1% aqueous solution of sodium hydroxide and washed again with hot water, before being dried to obtain 20.1 parts of a chlorinated copper phthalocyanine pigment having an average number of chlorine substitutions of 3.0.

The yield relative to the raw material phthalocyanine was 93.5%. The free copper content in the obtained chlorinated copper phthalocyanine pigment was 56 mg per 1 kg of pigment. The halogen distribution width was 6. Aluminum phthalocyanine and chlorinated aluminum phthalocyanine were not detected.

Comparative Example 1

First, 81 parts of aluminum chloride, 19 parts of sodium chloride and 1 part of iron chloride were heated and melted, and 20 parts of copper phthalocyanine was then added at 140° C. The temperature was then raised to 160° C., and 5 parts of chlorine gas were blown into the reaction system. The reaction liquid was then poured into 1,000 parts of water, and following filtration, the product was sequentially washed with hot water, washed with a 1% aqueous solution of hydrochloric acid, washed with hot water, washed with a 1% aqueous solution of sodium hydroxide, and washed again with hot water, before being dried to obtain 20.6 parts of a crude chlorinated copper phthalocyanine having an average number of chlorine substitutions of 2.0. The yield was 92%.

The product was unable to be used as a colorant in this state, and therefore a pigment formation process was subsequently conducted by acid pasting. Twenty parts of the crude chlorinated copper phthalocyanine was dissolved in 120 parts of 98% sulfuric acid, and the solution was stirred at 50° C. for 3 hours. Subsequently, the dissolved solution was poured into 600 parts of water with constant stirring, and the resulting mixture was heated to 70° C., filtered, and then sequentially washed with hot water, washed with a 1% aqueous solution of sodium hydroxide and washed again with hot water, before being dried to obtain 19.2 parts of a chlorinated copper phthalocyanine pigment having an average number of chlorine substitutions of 2.0 and a halogen distribution width of 5.

The yield was 96%. The amount of aluminum phthalocyanine and aluminum phthalocyanine that had been substituted with 1 to 4 chlorine atoms was 4.9%. The free copper content was 148 mg/kg.

Comparative Example 2

A 1 liter glass autoclave was charged with 28 parts of phthalic anhydride, 105 parts of chlorophthalic anhydride, 19 parts of cuprous chloride, 139 parts of urea, 0.5 parts of ammonium molybdate, and 210 parts of tert-amylbenzene as a solvent (product name: Hisol P, an alkylbenzene mixture, manufactured by Nippon Oil Corporation), and the mixture was reacted at 200° C. under a pressure of 2.0 kg/cm²·G for 4 hours. The solvent was then removed by heating the produced slurry under reduced pressure. Subsequently, 2,000 parts of water was added to the residue, and following stirring at 90° C. for 4 hours, the solid was filtered and dried, yielding 109.7 parts of a chlorinated copper phthalocyanine pigment having an average number of chlorine substitutions of 3.0 and a halogen distribution width of 4.

The yield was 85%. The free copper content was 3,560 mg/kg, and aluminum phthalocyanine and chlorinated aluminum phthalocyanine were not detected.

Comparative Example 3

With the exception of adding 2,000 parts of 8% sulfuric acid to the residue instead of the 2,000 parts of water used in Comparative Example 2, the same operations as Comparative Example 2 were performed to obtain 105.8 parts of a chlorinated copper phthalocyanine pigment having an average number of chlorine substitutions of 3.0 and a halogen distribution width of 3. The yield was 82%. The free copper content was 80 mg/kg, and aluminum phthalocyanine and chlorinated aluminum phthalocyanine were not detected.

Examples 2 to 12

Among the synthesis conditions for Example 1, the reaction solvent, the phthalocyanine, the N-haloimide compound, the catalyst, the reaction temperature and the reaction time were altered to the conditions shown in Tables 1 and 2, and syntheses were performed to obtain a series of halogenated phthalocyanine pigments. The yield, percentage yield, average number of chlorine substitutions, average number of bromine substitutions, halogen distribution width and free copper content for each product were as shown in Table 3. Further, aluminum phthalocyanine and halogenated aluminum phthalocyanine were not detected in any of the pigments.

Example 13

Twenty parts of copper phthalocyanine was dissolved in a short period of time in a 150° C. combined molten salt containing 80 parts of aluminum chloride, 10 parts of sodium chloride and 10 parts of sodium sulfate. With the reaction liquid held at 180° C., chlorine gas was introduced into the system at a rate of 2.1 parts per hour for 4.8 hours while the liquid was stirred vigorously. The reaction liquid was then poured into 1,000 parts of water. The insoluble matter was collected by filtration, washed with water and purified, and then dried to obtain 22.8 parts of a crude chlorinated phthalocyanine having an average number of chlorine substitutions of 3.1. The amount of chlorinated aluminum phthalocyanine was 0.6%.

The product was unable to be used as a colorant in this state, and therefore a pigment formation process was subsequently conducted by acid pasting. Twenty parts of the crude chlorinated copper phthalocyanine was dissolved in 120 parts of 98% sulfuric acid, and the solution was stirred at 50° C. for 3 hours. Subsequently, the dissolved solution was poured into 600 parts of water with constant stirring, and the resulting mixture was heated to 70° C., filtered, and then sequentially washed with hot water, washed with a 1% aqueous solution of sodium hydroxide and then washed again with hot water, before being dried to obtain 19.2 parts of a chlorinated copper phthalocyanine pigment having an average number of chlorine substitutions of 3.1 and a halogen distribution width of 5. The amount of chlorinated aluminum phthalocyanine was 0.6%. The free copper content was 90 mg/kg.

TABLE 1

| | Reaction solvent | | Phthalocyanine | |
|---|---|---|---|---|
| Example | Name | Amount added (parts by mass) | Name | Amount added (parts by mass) |
| 1 | 99.5% sulfuric acid | 140 | copper phthalocyanine | 20 |
| 2 | 2% fuming sulfuric acid | 140 | copper phthalocyanine | 20 |
| 3 | chlorosulfonic acid | 140 | copper phthalocyanine | 20 |
| 4 | polyphosphoric acid | 300 | copper phthalocyanine | 20 |
| 5 | chlorosulfonic acid | 140 | copper phthalocyanine | 20 |
| 6 | chlorosulfonic acid | 140 | copper phthalocyanine | 20 |
| 7 | chlorosulfonic acid | 140 | copper phthalocyanine | 20 |
| 8 | chlorosulfonic acid | 140 | metal-free phthalocyanine | 20 |
| 9 | chlorosulfonic acid | 140 | iron phthalocyanine | 20 |
| 10 | chlorosulfonic acid | 140 | cobalt phthalocyanine | 20 |
| 11 | chlorosulfonic acid | 140 | zinc phthalocyanine | 20 |
| 12 | chlorosulfonic acid | 140 | nickel phthalocyanine | 20 |

TABLE 2

| | N-haloimide compound | | | | | |
|---|---|---|---|---|---|---|
| Example | Name | Amount added (parts by mass) | Amount added (molar equivalents) | Iodine (parts by mass) | Reaction temperature (° C.) | Reaction time (hours) |
| 1 | trichloroisocyanuric acid | 8.8 | 3.3 | 0.1 | 50 | 3 |
| 2 | dibromoisocyanuric acid | 20.0 | 4.0 | 0.1 | 30 | 4 |
| 3 | trichloroisocyanuric acid | 6.0 | 2.2 | 0.1 | 20 | 2 |
| 4 | trichloroisocyanuric acid | 15.0 | 5.6 | 0.1 | 120 | 8 |
| 5 | sodium dichloroisocyanurate | 12.6 | 3.3 | 0.1 | 20 | 3 |
| 6 | dibromoisocyanuric acid | 17.0 | 3.4 | 0.1 | 20 | 3 |
| 7 | potassium dichloroisocyanurate | 28.7 | 7.0 | 0.1 | 20 | 4 |
| 8 | trichloroisocyanuric acid | 9.9 | 3.3 | 0.1 | 30 | 3 |
| 9 | trichloroisocyanuric acid | 8.8 | 3.2 | 0.1 | 30 | 3 |
| 10 | trichloroisocyanuric acid | 9.2 | 3.4 | 0.1 | 30 | 3 |
| 11 | trichloroisocyanuric acid | 9.4 | 3.5 | 0.1 | 60 | 3 |
| 12 | trichloroisocyanuric acid | 9.2 | 3.4 | 0.1 | 30 | 3 |

TABLE 3

| Example | Yield (parts by mass) | Yield (% by mass) | Number of chlorine substitutions (average) | Number of bromine substitutions (average) | Halogen distribution width | Free copper (mg/kg) |
|---|---|---|---|---|---|---|
| 1 | 20.1 | 93.5 | 3.0 | | 6 | 56 |
| 2 | 28.7 | 94.4 | | 3.8 | 7 | 101 |
| 3 | 21.9 | 97.1 | 2.1 | | 5 | 22 |
| 4 | 21.4 | 96.4 | 4.0 | | 7 | 58 |
| 5 | 22.6 | 95.8 | 3.0 | | 6 | 28 |
| 6 | 27.2 | 95.4 | | 3.1 | 6 | 82 |
| 7 | 23.5 | 84.5 | 6.5 | | 9 | 141 |
| 8 | 20.4 | 84.2 | 3.1 | | 6 | 0 |
| 9 | 21.1 | 89.0 | 3.0 | | 6 | 0 |
| 10 | 21.9 | 91.6 | 3.2 | | 6 | 0 |

TABLE 3-continued

| Example | Yield (parts by mass) | Yield (% by mass) | Number of chlorine substitutions (average) | Number of bromine substitutions (average) | Halogen distribution width | Free copper (mg/kg) |
|---|---|---|---|---|---|---|
| 11 | 23.0 | 95.4 | 3.4 | | 6 | 0 |
| 12 | 21.3 | 89.4 | 3.2 | | 6 | 0 |

[Evaluation of Examples 1 to 13]

Using the pigments obtained in Examples 1 to 13 as colorants for plastic, evaluations of the heat resistance, the migration resistance and the shrinkage were performed using the methods described above. The results are shown in Table 4. Examples 1 to 12 exhibited excellent heat resistance and migration resistance. Further, each of the examples exhibited a shrinkage difference within a range from ±10%, and no visual deformation was observed.

In Example 13, slight migration was observed, but the colorant exhibited excellent heat resistance and yielded a shrinkage difference within a range from ±10%, and no visual deformation was observed.

[Evaluation of Comparative Example 1]

Comparative Example 1 does not satisfy the aforementioned condition (3) of the present invention. The pigment obtained in Example 3 and the pigment obtained in Comparative Example 1 which had a similar number of average chlorine substitutions were compared. The results are shown in Table 4. The shrinkage difference values were both numbers within a range from ±10%, and little difference was observed, including no visual deformation. However, the migration resistance was inferior in the case where the pigment obtained in Comparative Example 1 was used. Further, when the plates prepared for measurement of the shrinkage difference were subjected to color measurement using a colorimeter (Minolta Spectroscopic Colorimeter CM-2002, manufactured by Konica Minolta, Inc.), the results when the pigment obtained in Example 3 was used were clarity C*=38.4 and hue angle=255.4°. In contrast, the results when the pigment obtained in Comparative Example 1 was used were C*=33.3 and hue angle=245.7°. In other words, compared with the case where the pigment of Example 3 was used, the case in which the pigment of Comparative Example 1 was used yielded a product that was greener and unclear.

[Evaluation of Comparative Example 2 and Comparative Example 3]

Comparative Example 2 and Comparative Example 3 do not satisfy the aforementioned condition (2) of the present invention. Further, the pigment of Comparative Example 2 contained a large free copper content. The pigment obtained in Example 1 was compared with the pigments obtained in Comparative Example 2 and Comparative Example 3. The results are shown in Table 4. Comparison of the case where the pigment obtained in Example 1 was used with the case where the pigment obtained in Comparative Example 2 having a similar average number of chorine substitutions was used revealed no noticeable difference in the migration resistance. However, there was a significant difference in terms of heat resistance and shrinkage, with Comparative Example 2 exhibiting slightly inferior heat resistance to Example 1, having a shrinkage difference of 39.2%, and exhibiting visible deformation. Furthermore, comparison of the case where the pigment obtained in Comparative Example 3 was used with Example 1 revealed that both exhibited excellent heat resistance and migration resistance of similar levels, but there was a significant difference in terms of shrinkage, with Comparative Example 3 yielding a shrinkage difference of 38.5% and producing visible deformation.

TABLE 4

| Example | Heat-resistant temperature (° C.) | ΔE* (300° C.) | Migration resistance | Shrinkage difference (%) |
|---|---|---|---|---|
| Example 1 | 300 | 1.6 | ◎ | 3.2 |
| Example 2 | 300 | 1.7 | ◎ | 3.4 |
| Example 3 | 300 | 1.9 | ◎ | 7.8 |
| Example 4 | 300 | 1.6 | ◎ | 3.1 |
| Example 5 | 300 | 1.7 | ◎ | 3.3 |
| Example 6 | 300 | 1.7 | ◎ | 3.4 |
| Example 7 | 300 | 1.6 | ◎ | 3.1 |
| Example 8 | 270 | 3.8 | ◎ | 7.5 |
| Example 9 | 280 | 3.2 | ◎ | 6.8 |
| Example 10 | 300 | 1.5 | ◎ | 9.5 |
| Example 11 | 300 | 1.9 | ◎ | 4.4 |
| Example 12 | 300 | 1.6 | ◎ | 4.8 |
| Example 13 | 300 | 1.9 | ○ | 4.8 |
| Comparative Example 1 | 300 | 1.9 | Δ | 7.4 |
| Comparative Example 2 | 280 | 2.8 | ◎ | 39.2 |
| Comparative Example 3 | 300 | 1.6 | ◎ | 38.5 |

Example 14

First, 9.0 parts of a chlorinated copper phthalocyanine having an average number of chlorine substitutions of 0.5 was added to 64 parts of chlorosulfonic acid while cooled in an ice bath to maintain the temperature at 20° C. or lower. Next, 0.1 parts of iodine was added, and following adjustment of the temperature to 20° C., 3.0 parts of trichloroisocyanuric acid (0.85 times moles or 2.55 molar equivalents of effective chlorine relative to the raw material chlorinated copper phthalocyanine) was added, and the resulting mixture was stirred at the same temperature for 3 hours. After cooling to 10° C., 96 parts of chlorosulfonic acid was added gradually, with due care taken of foaming. The temperature was then adjusted to 20° C., and 14.4 parts of a copper phthalocyanine (T-99 Crude Blue, manufactured by Zhuhai Toyochem Co., Ltd.) was added and stirred for one hour.

Subsequently, the reaction liquid was poured gradually into 1,200 parts of water with constant stirring, and the resulting mixture was heated to 70° C., filtered, and then sequentially washed with hot water, washed with a 1% aqueous solution of sodium hydroxide and washed again with hot water, before being dried to obtain 23.5 parts of a colorant for plastic containing a 4:6 mixture of a chlorinated copper phthalocyanine pigment having an average number of chlorine substitutions of 3.1 and a halogen distribution width of 6, and an α-phthalocyanine pigment.

The free copper content in the obtained phthalocyanine pigment (containing both the halogenated phthalocyanine pigment (A) and the phthalocyanine pigment (B)) was 36 mg/kg. Aluminum phthalocyanine and chlorinated aluminum phthalocyanine were not detected. Ten parts of the colorant and 10 parts of calcium stearate were mixed to obtain 20 parts of a coloring composition for plastic.

Example 15

First, 9.0 parts of a chlorinated copper phthalocyanine having an average number of chlorine substitutions of 0.5 was added to 64 parts of 2% fuming sulfuric acid while cooled in an ice bath to maintain the temperature at 30° C. or lower. Next, 0.1 parts of iodine was added, and following adjustment of the temperature to 20° C., 3.0 parts of trichloroisocyanuric acid (0.85 times moles or 2.55 molar equivalents of effective chlorine relative to the raw material chlorinated copper phthalocyanine) was added, and the resulting mixture was stirred at the same temperature for 3 hours. After cooling to 10° C., 144 parts of 98% sulfuric acid was added gradually, with due care taken of foaming. The temperature was then adjusted to 20° C., and 22.3 parts of a copper phthalocyanine (T-99 Crude Blue, manufactured by Zhuhai Toyochem Co., Ltd.) was added and stirred for one hour.

Subsequently, the reaction liquid was poured gradually into 1,200 parts of water with constant stirring, and the resulting mixture was heated to 70° C., filtered, and then sequentially washed with hot water, washed with a 1% aqueous solution of sodium hydroxide and washed again with hot water, before being dried to obtain 31.4 parts of a colorant for plastic containing a 3:7 mixture of a chlorinated copper phthalocyanine pigment having an average number of chlorine substitutions of 3.1 and a halogen distribution width of 6, and an α-phthalocyanine pigment.

The free copper content in the obtained phthalocyanine pigment was 52 mg per 1 kg of the pigment. Aluminum phthalocyanine and chlorinated aluminum phthalocyanine were not detected. Ten parts of the colorant and 10 parts of an ester of montanoic acid and butylene glycol were mixed to obtain 20 parts of a coloring composition for plastic.

Example 16

First, 7.5 parts of an α-form low-chlorine phthalocyanine pigment having a free copper content of 151 mg/kg, no aluminum phthalocyanine contamination and an average number of chlorine substitutions of 0.55 was mixed with 2.5 parts of the pigment obtained in Example 4 to obtain 10 parts of a colorant for plastic. Ten parts of this colorant and 10 parts of dicalcium phthalate were mixed to obtain 20 parts of a coloring composition for plastic.

The α-form low-chlorine phthalocyanine pigment mentioned above was prepared in the manner described below.

Namely, 18 parts of a crude semichlorophthalocyanine containing no aluminum phthalocyanine contamination and having an average number of chlorine substitutions of 0.5, and 2 parts of a crude monochlorophthalocyanine also containing no aluminum phthalocyanine contamination and having an average number of chlorine substitutions of 1.0 were dissolved gradually in 400 parts of 5° C. 98% sulfuric acid, and the resulting mixture was stirred for about 2 hours with the temperature maintained at 5° C. or lower. Subsequently, the resulting sulfuric acid solution was added dropwise over 30 minutes to 8,000 parts of vigorously stirred ice water. Subsequently, the mixture was filtered at 40° C. The crystals were washed with water until the acid was removed, and then dried to obtain 18 parts of the α-form low-chlorine phthalocyanine pigment. The crude semichlorophthalocyanine having an average number of chlorine substitutions of 0.5 and the monochlorophthalocyanine also having an average number of chlorine substitutions of 1.0 were prepared by the N-haloimide compound method described above using phthalocyanine as a raw material.

Example 17

First, 7.5 parts of an ε-form phthalocyanine pigment having a free copper content of 82 mg/kg and no aluminum phthalocyanine contamination was mixed with 2.5 parts of the pigment obtained in Example 4 to obtain 10 parts of a colorant for plastic. Ten parts of this colorant and 4 parts of zinc stearate were mixed to obtain 14 parts of a coloring composition for plastic.

The ε-form phthalocyanine pigment mentioned above was prepared in the manner described below.

A twin-arm kneader with a capacity of 2,000 parts by volume was charged with 65 parts of an α-form copper phthalocyanine containing no aluminum phthalocyanine contamination, 35 parts of an ε-form copper phthalocyanine containing no aluminum phthalocyanine contamination, 1,250 parts of sodium sulfate and 200 parts of diethylene glycol, and the resulting mixture was kneaded for 8 hours with the temperature maintained at 110° C. Following grinding, the mixture was poured into 3,500 parts of a 5% aqueous solution of sulfuric acid at 70° C., and the mixture was stirred for one hour at this temperature. The mixture was then filtered and washed with water, and the resulting water paste of the filtered pigment was placed in 1,000 parts of a 5% aqueous solution of sulfuric acid at 70° C., stirred for one hour at this temperature, and then filtered, washed with water and dried to obtain 98 parts of the ε-form phthalocyanine pigment.

Example 18

First, 9 parts of a β-form phthalocyanine pigment having a free copper content of 189 mg/kg and no aluminum phthalocyanine contamination and 1 part of the chlorinated copper phthalocyanine pigment obtained in Example 1 were mixed thoroughly in a mixer to obtain 10 parts of a colorant for plastic. Subsequently, a triple roll mill was used to knead 10 parts of the obtained colorant for plastic with 10 parts of a polyethylene wax having a weight-average molecular weight of 4,200 and a softening point of 110° C. to obtain 20 parts of a coloring composition for plastic.

The β-form phthalocyanine pigment mentioned above was prepared in the manner described below. Namely, a twin-arm kneader with a capacity of 3,000 parts by volume was charged with 250 parts of a crude phthalocyanine having a free copper content of 380 mg/kg and no aluminum phthalocyanine contamination, 1,750 parts of sodium sulfate and 300 parts of polyethylene glycol, and the resulting mixture was kneaded for 5 hours with the temperature maintained at 105° C. Following grinding, the mixture was poured into 3,500 parts of a 5% aqueous solution of sulfuric acid at 70° C., and the mixture was stirred for one hour at this temperature. The mixture was then filtered and washed with water, and the resulting water paste of the filtered pigment was placed in 1,000 parts of a 5% aqueous solution of sulfuric acid at 70° C., stirred for one hour at this temperature, and then filtered, washed with water and dried to obtain 235 parts of the β-form phthalocyanine.

Comparative Example 4

First, 88 parts of the β-form phthalocyanine pigment, 10 parts of the chlorinated phthalocyanine pigment obtained in Comparative Example 1, and 2 parts of a phthalocyanine derivative represented by compound A shown below were mixed using a mixer to obtain 100 parts of a colorant for plastic. The free copper content was 2,780 mg per 1 kg of the pigment. Subsequently, a triple roll mill was used to knead 10 parts of the obtained colorant for plastic with 10 parts of a polyethylene wax having a weight-average molecular weight of 4,200 and a softening point of 110° C. to obtain 20 parts of a coloring composition for plastic.

[Chemical formula 1]

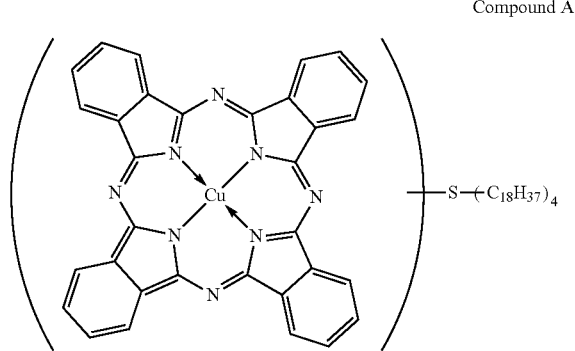

Compound A

[Evaluation of Examples 14 to 18]

The colorants for plastic obtained in Examples 14 to 18 were evaluated for heat resistance, migration resistance and shrinkage. The results are shown in Table 5. Examples 14 to 18 exhibited excellent heat resistance and migration resistance, and displayed a shrinkage difference within a range from ±10%. Further, no visual deformation was observed. Compared with a commercially available phthalocyanine pigment of the same crystal form, the colorants had comparable color strength, and exhibited similar hue and clearness. Compared with the case where a molded plate was prepared using only the colorant for plastic, the case where the coloring composition for plastic was used yielded superior color strength.

[Evaluation of Comparative Example 4]

Comparative Example 4 does not satisfy the aforementioned condition (3) of the present invention. The colorant for plastic obtained in Comparative Example 4 and the colorant for plastic obtained in Example 18 were compared. The results are shown in Table 5. In terms of shrinkage, both colorants yielded a shrinkage difference within a range from ±10%, and no visual deformation was observed. However, the migration resistance was inferior for the colorant obtained in Comparative Example 4. Further, the heat resistance was also inferior for the colorant for plastic obtained in Comparative Example 4.

TABLE 5

| Example | Heat resistance Heat-resistant temperature (° C.) | $\Delta E^*$ (300° C.) | Migration resistance | Shrinkage difference (%) |
|---|---|---|---|---|
| Example 14 | 300 | 1.6 | ⊚ | 3.8 |
| Example 15 | 300 | 1.8 | ⊚ | 8.4 |
| Example 16 | 300 | 1.7 | ⊚ | 8.8 |
| Example 17 | 280 | 2.6 | ○ | 3.9 |
| Example 18 | 300 | 1.8 | ⊚ | 7.2 |
| Comparative Example 4 | 270 | 2.8 | Δ | 6.5 |

Example 19

An example in which a polypropylene was used as the resin having partial crystallinity is described. Two parts of the coloring composition for plastic obtained in Example 14 was mixed with 1,000 parts of a polypropylene resin (product name: Prime Polypro J105, manufactured by Prime Polymer Co., Ltd.) to obtain a coloring composition for plastic. Using this coloring composition, molding was performed in an injection molding apparatus under molding conditions including a molding temperature of 220° C., a mold temperature of 40° C., and molding conditions that yielded a shrinkage difference of zero for a natural plate composed only of the above polypropylene resin, thus forming a molded plate.

The shrinkage difference was −3.8%, indicating a shrinkage difference within the range of ±10%, and no visual deformation was observed. Further, the hue was also favorable and of a similar level to that of a plate colored only with a commercially available α-phthalocyanine pigment, with the plate exhibiting excellent color strength.

Example 20

An example in which a polyethylene terephthalate was used as the resin having partial crystallinity is described. Two parts of the coloring composition for plastic obtained in Example 15 was mixed with 1,000 parts of a polyethylene terephthalate resin (product name: Vylopet EMC-307, manufactured by Toyobo Co., Ltd.) to obtain a coloring composition for plastic. Using this coloring composition, molding was performed in an injection molding apparatus under molding conditions including a molding temperature of 275° C., a mold temperature of 85° C., and molding conditions that yielded a shrinkage difference of zero for a natural plate composed only of the above polyethylene terephthalate resin, thus forming a molded plate.

The shrinkage difference was 9.5%, indicating a value within the range of ±10%, and no visual deformation was observed. Further, the hue was also favorable and of a similar level to that of a plate colored only with a commercially available α-phthalocyanine pigment, with the plate exhibiting excellent color strength.

INDUSTRIAL APPLICABILITY

The present invention is able to provide a colorant for plastic that can color a resin without changing the mechanical or chemical properties of the resin, and can produce a plastic molded article having essentially no migration, extremely low discoloration due to heat, and no deformation such as warping or distortion. Further, the present invention can also provide a coloring composition for plastic capable of forming a plastic molded article having essentially no migration, extremely low discoloration due to heat, and no deformation, as well as a plastic molded article that uses the coloring composition for plastic.

The invention claimed is:

1. A colorant for plastic comprising:
   a halogenated phthalocyanine pigment (A) that satisfies conditions (1) to (4) below:
   (1) an average number of halogen substitutions is at least 2.0 but not more than 7.0,
   (2) a halogen distribution width is at least 5,
   (3) an amount of aluminum phthalocyanine and halogenated aluminum phthalocyanine is less than 0.1% by mass, and
   (4) a central element is at least one element selected from the group consisting of hydrogen, manganese, iron, cobalt, zinc, nickel and copper; and
   a phthalocyanine pigment (B), wherein a central element of the phthalocyanine pigment (B) is copper, an amount of free copper within the phthalocyanine pigment (B) is not more than 200 mg/kg, a crystal form of the phthalocyanine pigment (B) is an α-form or a β-form, and the phthalocyanine pigment (B) has been halogenated so that the average number of halogen substitutions is not more than 1.1, wherein an amount of the halogenated phthalocyanine pigment (A) is from 10 to 50% by mass relative to a total mass of the halogenated phthalocyanine pigment (A) and the phthalocyanine pigment (B).

2. The colorant for plastic according to claim 1, wherein an amount of free copper within the halogenated phthalocyanine pigment (A) is not more than 200 mg/kg.

3. A coloring composition for plastic comprising the colorant for plastic according to claim 1.

4. The coloring composition for plastic according to claim 3, further comprising at least one compound selected from the group consisting of aromatic carboxylic acids, aliphatic carboxylic acids, metal salts of aromatic carboxylic acids, metal salts of aliphatic carboxylic acids, and aliphatic carboxylic acid esters.

5. The coloring composition for plastic according to claim 3, further comprising a resin.

6. The coloring composition for plastic according to claim 5, wherein the resin comprises a polyethylene wax.

7. A plastic molded article molded using the coloring composition for plastic according to claim 3.

8. The colorant for plastic according to claim 1, wherein
the average number of halogen substitutions is at least 3.0 but not more than 7.0,
the halogen distribution width is at least 5 but not more than 7,
an amount of free copper within the halogenated phthalocyanine pigment (A) is not more than 200 mg/kg, and
the crystal form of the phthalocyanine pigment (B) is the α-form.

9. The colorant for plastic according to claim 1, wherein the halogen distribution width is at least 5 and not more than 6.

10. The colorant for plastic according to claim 1, wherein the crystal form of the phthalocyanine pigment (B) is the α-form.

* * * * *